(12) United States Patent
Watanabe et al.

(10) Patent No.: US 10,895,226 B2
(45) Date of Patent: Jan. 19, 2021

(54) TURBOCHARGER

(71) Applicant: MITSUBISHI HEAVY INDUSTRIES ENGINE & TURBOCHARGER, LTD., Sagamihara (JP)

(72) Inventors: Daigo Watanabe, Tokyo (JP); Takao Yokoyama, Tokyo (JP); Takashi Yoshimoto, Tokyo (JP); Chikako Kato, Tokyo (JP); Keigo Sakamoto, Tokyo (JP); Yosuke Dammoto, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 114 days.

(21) Appl. No.: 16/096,404

(22) PCT Filed: May 18, 2016

(86) PCT No.: PCT/JP2016/064721
§ 371 (c)(1),
(2) Date: Oct. 25, 2018

(87) PCT Pub. No.: WO2017/199364
PCT Pub. Date: Nov. 23, 2017

(65) Prior Publication Data
US 2019/0136804 A1     May 9, 2019

(51) Int. Cl.
*F02C 6/12*     (2006.01)
*F02M 35/10*     (2006.01)
(Continued)

(52) U.S. Cl.
CPC ..... *F02M 35/10144* (2013.01); *F01D 25/265* (2013.01); *F02B 39/00* (2013.01);
(Continued)

(58) Field of Classification Search
CPC .. F02C 6/12; F02C 7/24; F01D 25/265; F01D 25/243; F01D 25/164; F04D 25/04;
(Continued)

(56) References Cited

U.S. PATENT DOCUMENTS 8,092,162 B2    1/2012    Masson et al.
2008/0197627 A1    8/2008    Baudoin et al.
(Continued)

FOREIGN PATENT DOCUMENTS

DE    102009024151 A1    12/2010
DE    102013111562 A1    4/2015
(Continued)

OTHER PUBLICATIONS

International Preliminary Report on Patentability dated Nov. 29, 2018 in corresponding International PCT Application No. PCT/JP2016/064721 with an English Translation.
(Continued)

*Primary Examiner* — Kenneth J Hansen
*Assistant Examiner* — Maxime M Adjagbe
(74) *Attorney, Agent, or Firm* — Birch, Stewart, Kolasch & Birch, LLP

(57) ABSTRACT

A turbocharger includes a gripping unit gripping a turbine-housing side flange portion and a bearing-housing side flange portion to couple a turbine housing and a bearing housing. In a state where the turbine housing and the bearing housing are coupled by the gripping unit, an elastic force in a direction to separate the turbine-housing side flange portion and the bearing-housing side flange portion from each other is applied to each of the turbine housing and the bearing housing.

6 Claims, 13 Drawing Sheets

(51) Int. Cl.
  *F02B 39/00* (2006.01)
  *F01D 25/26* (2006.01)
  *F16B 2/06* (2006.01)
  *F16F 1/02* (2006.01)
(52) U.S. Cl.
  CPC ............... *F02C 6/12* (2013.01); *F16B 2/06* (2013.01); *F16F 1/027* (2013.01); *F05D 2220/40* (2013.01); *F05D 2260/39* (2013.01)
(58) Field of Classification Search
  CPC ........ F04D 25/243; F02B 37/00; F02B 39/00; F04B 39/00; F05D 2260/39; F05D 2260/96; F05D 2240/40
  See application file for complete search history.

(56) References Cited

U.S. PATENT DOCUMENTS

| | | | |
|---|---|---|---|
| 2010/0166541 A1 | 7/2010 | Hausser et al. | |
| 2010/0296925 A1 | 11/2010 | Sakai | |
| 2011/0014036 A1 | 1/2011 | Boening et al. | |
| 2015/0037146 A1* | 2/2015 | Yamaguchi | F02C 6/12 415/174.5 |
| 2017/0204743 A1 | 7/2017 | Yokoyama et al. | |

FOREIGN PATENT DOCUMENTS

| | | |
|---|---|---|
| EP | 1998009 A1 | 12/2008 |
| EP | 2199570 A2 | 6/2010 |
| JP | 56-138421 A | 10/1981 |
| JP | 61-250400 A | 11/1986 |
| JP | 2003-227344 A | 8/2003 |
| JP | 2008-202791 A | 9/2008 |
| JP | 2009-167971 A | 7/2009 |
| JP | 2010-138885 A | 6/2010 |
| JP | 2011-106303 A | 6/2011 |
| JP | 2015-163778 A | 9/2015 |
| WO | WO 2009/068460 A1 | 6/2009 |
| WO | WO 2016/071959 A1 | 5/2016 |

OTHER PUBLICATIONS

International Search Report on PCT/JP2016/064721 dated Jul. 19, 2016.
Office Action dated Jul. 23, 2019 in the corresponding Japanese Application No. 2018-517994.
Japanese Office Action for Japanese Application No. 2018-517994, dated May 14, 2019, with English translation.
Office Action dated Dec. 12, 2019 issued in the corresponding European Application No. 16902383.5.
Extended European Search Report for European Application No. 16902383.5, dated May 17, 2019.
Office Action dated Mar. 30, 2020 issued in counterpart Chinese Application No. 201680085768.0 with an English Translation.

* cited by examiner

AXIAL DIRECTION

AXIAL DIRECTION

TURBOCHARGER

TECHNICAL FIELD

The present disclosure relates a turbocharger.

BACKGROUND ART

Generally, a turbocharger includes a turbine rotor, a turbine housing which accommodates the turbine rotor, a bearing device supporting the shaft of the turbine rotor rotatably, and a bearing housing which accommodates the bearing device.

Further, a turbocharger for an automobile or the like may include a turbine-housing side flange portion formed on the radially outer side of a turbine housing, a bearing-housing side flange portion formed on the radially outer side of a bearing housing so as to face the turbine-housing side flange portion, and a gripping unit that grips the turbine-housing side flange portion and the bearing-housing side flange portion to couple the turbine housing and the bearing housing.

As an example of such a gripping unit, Patent Document 1 discloses a V band clamp that fastens a turbine housing and a bearing housing together. The V band clamp disclosed in Patent Document 1 connects first end portions of a pair of clamp pieces formed to have a semi-arc shape with a link and tightly fastens second end portions of the pair of clamp pieces, while the end portions of the clamp pieces are matched in position, thereby fastening a turbine housing and a bearing housing. With the above configuration, the fastening force is converted into the tension force of the clamp pieces, and thereby the housings are fastened.

CITATION LIST

Patent Literature

Patent Document 1: JP2015-163778A

SUMMARY

Problems to be Solved

According to findings of the present inventors, in a case where a turbocharger includes a turbine-housing side flange portion and a bearing-housing side flange portion gripped by a gripping unit, loosening may occur in the coupling of the turbine housing and the bearing housing during transient operation of the engine. Specifically, during transient operation of the engine, the thermal expansion amount of the gripping unit may exceed the sum of the thermal expansion amount of the turbine-housing side flange portion and the thermal expansion amount of the bearing-housing side flange portion. In this case, coupling between the turbine housing and the bearing housing may become loose.

In this regard, Patent Document 1 does not disclose any idea for suppressing loosening of coupling of the turbine housing and the bearing housing during transient operation of the engine. Further, the document does not disclose the problem itself of occurrence of loosening in the coupling of the turbine housing and the bearing housing due to thermal expansion during transient operation.

The present invention was made in view of the above described typical problem, and an object is to provide a turbocharger capable of suppressing occurrence of loosening in the coupling of the turbine housing and the bearing housing during transient operation of the engine.

Solution to the Problems (1) A turbocharger according to at least one embodiment of the present invention includes: a turbine rotor; a turbine housing which includes a turbine-housing side flange portion on a radially outer side, and which accommodates the turbine rotor; a bearing device rotatably supporting a shaft connected to the turbine rotor; and a bearing housing which includes, on a radially outer side, a bearing-housing side flange portion facing the turbine-housing side flange portion, and which accommodates the bearing device; and a gripping unit gripping the turbine-housing side flange portion and the bearing-housing side flange portion to couple the turbine housing and the bearing housing. In a state where the turbine housing and the bearing housing are coupled by the gripping unit, an elastic force in a direction to separate the turbine-housing side flange portion and the bearing-housing side flange portion from each other is applied to each of the turbine housing and the bearing housing.

With the above turbocharger (1), even if the gripping unit thermally expands during transient operation of the engine, the turbine-housing side flange portion and the bearing-housing side flange portion follow the thermal expansion of the gripping unit due to the elastic forces. Thus, it is possible to maintain a situation where the gripping unit grips and holds the turbine-housing side flange portion and the bearing-housing side flange portion, and suppress occurrence of loosening in coupling of the turbine housing and the bearing housing.

(2) In some embodiments, the above turbocharger (1) further includes a biasing member disposed between the turbine housing and the bearing housing, and configured to bias the turbine housing and the bearing housing so as to apply the elastic force to the turbine housing and the bearing housing.

With the above turbocharger (2), even if the gripping unit thermally expands during transient operation of the engine, the turbine-housing side flange portion and the bearing-housing side flange portion follow the thermal expansion of the gripping unit due to the elastic force applied by the biasing force. Thus, it is possible to maintain a situation where the gripping unit grips and holds the turbine-housing side flange portion and the bearing-housing side flange portion, and suppress occurrence of loosening in coupling of the turbine housing and the bearing housing.

(3) In some embodiments, in the above turbocharger (2), the biasing member is a back plate disposed between the turbine rotor and the bearing housing, and at least a part of the back plate is held between the turbine housing and the bearing housing in an elastically deformed state.

With the above turbocharger (3), even if the gripping unit thermally expands during transient operation of the engine, the turbine-housing side flange portion and the bearing-housing side flange portion follow the thermal expansion of the gripping unit due to the elastic force applied by the back plate. Thus, it is possible to maintain a situation where the gripping unit grips and holds the turbine-housing side flange portion and the bearing-housing side flange portion, and suppress occurrence of loosening in coupling of the turbine housing and the bearing housing.

(4) In some embodiments, in the above turbocharger (3), the turbine housing supports a radially outer portion of the back plate in an axial direction of the turbine rotor from a side of the turbine rotor against the elastic force of the back plate, and the bearing housing supports a radially inner portion of the back plate in the axial direction from a side opposite to the turbine rotor against the elastic force.

With the above turbocharger (4), the turbine housing receives an elastic force toward the turbine rotor in the axial direction from the radially outer portion of the back plate (elastic force in a direction to separate the turbine-housing side flange portion from the bearing-housing side flange portion) while the turbine housing and the bearing housing are coupled by the gripping unit, and the bearing housing receives an elastic force opposite to the turbine rotor in the axial direction from the radially inner portion of the back plate (elastic force in a direction to separate the bearing-housing side flange portion from the turbine-housing side flange portion). Thus, it is possible to suppress occurrence of loosening in the coupling of the turbine housing and the bearing housing, by utilizing the elastic force of the entire back plate.

(5) In some embodiments, in the above turbocharger (3), the turbine housing supports a radially outer portion of the back plate in an axial direction of the turbine rotor from a side of the turbine rotor against the elastic force, and the bearing housing supports the radially outer portion of the back plate in the axial direction from a side opposite to the turbine rotor against the elastic force.

With the above turbocharger (5), the turbine housing receives an elastic force toward the turbine rotor in the axial direction from the radially outer portion of the back plate (elastic force in a direction to separate the turbine-housing side flange portion from the bearing-housing side flange portion) while the turbine housing and the bearing housing are coupled by the gripping unit, and the bearing housing receives an elastic force opposite to the turbine rotor in the axial direction from the radially outer portion of the back plate (elastic force in a direction to separate the bearing-housing side flange portion from the turbine-housing side flange portion).

Thus, it is possible to enhance the design flexibility with regard to the shape of the radially inner portion of the back plate while suppressing occurrence of loosening in the coupling of the turbine housing and the bearing housing, by utilizing the elastic force of the radially outer portion of the back plate.

(6) In some embodiments, in the above turbocharger (5), the radially outer portion of the back plate has a cross-sectional shape along the axial direction which is a V shape, a C shape, a rectangular U shape, or an oblique shape intersecting with the axial direction.

With the above turbocharger (6), it is possible to utilize the elastic force of the back plate to suppress occurrence of loosening in the coupling between the turbine housing and the bearing housing, while forming the radially outer portion of the back plate into a simple shape.

(7) In some embodiments, in the above turbocharger (6), the cross-sectional shape of the radially outer portion of the back plate along the axial direction is a V shape, a C shape, or a rectangular U shape, and an opening of the V shape, an opening of the C shape, or an opening of the rectangular U shape is open toward an inner side or an outer side in a radial direction of the turbine rotor.

With the above configuration (7), it is possible to utilize the elastic force of the back plate to suppress occurrence of loosening in the coupling between the turbine housing and the bearing housing, while forming the back plate into a simple shape.

(8) In some embodiments, in the turbocharger according to any one of the above (3) to (7), the radially outer portion of the back plate is elastically deformed opposite to the turbine rotor in an axial direction of the turbine rotor, and the turbine housing supports the back plate on a radially outer side of a position where the radially outer portion is supported by the bearing housing.

With the above turbocharger (8), it is possible to utilize the elastic force of the back plate to suppress occurrence of loosening in the coupling between the turbine housing and the bearing housing, while forming the back plate into a simple shape.

(9) In some embodiments, in the turbocharger according to any one of the above (3) to (7), the radially outer portion of the back plate is elastically deformed toward the turbine rotor in an axial direction of the turbine rotor, and the turbine housing supports the back plate on a radially inner side of a position where the radially outer portion is supported by the bearing housing.

With the above turbocharger (9), it is possible to utilize the elastic force of the back plate to suppress occurrence of loosening in the coupling between the turbine housing and the bearing housing, while forming the back plate into a simple shape.

(10) In some embodiments, in the turbocharger according to any one of the above (3) to (9), the back plate is supported on the turbine housing from a first side in an axial direction of the turbine rotor and is supported on the bearing housing from a second side in the axial direction. The back plate is configured to satisfy an expression $df-di<\delta 0-\delta 1$, where $\delta$ is a step in the axial direction between a back-plate side first supported portion of the back plate supported on the turbine housing, and a back-plate side second supported portion of the back plate supported on the bearing housing, $\delta 0$ is the step $\delta$ in a natural state of the back plate, $\delta 1$ is an initial step $\delta$ of the step $\delta$ in an initial state after the back plate is mounted, d is a distance in the axial direction between a turbine-housing side support portion of the turbine housing supporting the back-plate side first supported portion and a bearing-housing side support portion of the bearing housing supporting the back-plate side second supported portion, di is the distance d in the initial state, and df is the distance d at the time when the turbocharger is at full load.

With the above turbocharger (10), even if the distance between the turbine-housing side support portion and the bearing-housing side support portion is increased from the initial state corresponding to the above difference (df–di) due to thermal expansion of the turbine housing and the bearing housing when the turbocharger is at full load, the back-plate side first supported portion follows the turbine-housing side support portion and the back-plate side second supported portion follows the bearing-housing side support portion, due to the elastic force of the back plate. Thus, it is possible to utilize the elastic force of the back plate to suppress occurrence of loosening in the coupling between the turbine housing and the bearing housing, over the period from the standing time to the full-load time of the turbocharger.

(11) In some embodiments, in the turbocharger according to any one of the above (3) to (10), in a state where the turbine housing and the bearing housing are coupled by the gripping unit, the turbine-housing side flange portion and the bearing-housing side flange portion are in contact in an initial state after the back plate is mounted.

With the above turbocharger (11), in the initial state after the back plate is mounted, the turbine-housing side flange portion and the bearing-housing side flange portion are in contact regardless of the dimension variation of the plate thickness or the like of the back plate, which facilitates management of the gripping force of the gripping unit to grip the turbine-housing side flange portion and the bearing-housing side flange portion (if the gripping unit is the above described V band clamp, management of the fastening force of the bolt). In other words, it is possible to stabilize the coupling state between the turbine housing and the bearing housing.

(12) In some embodiments, in the turbocharger according to any one of the above (1) to (11), a gap is disposed between the turbine-housing side flange portion and the bearing-housing side flange portion in a state of not being gripped by the gripping unit. The gripping unit is configured to grip the turbine-housing side flange portion and the bearing-housing side flange portion so as to elastically deform the turbine-housing side flange portion in an axial direction of the turbine rotor toward the bearing-housing side flange portion and elastically deform the bearing-housing side flange portion in the axial direction toward the turbine-housing side flange portion, and generate the elastic force as a reaction force against a gripping force by the gripping unit on each of the turbine-housing side flange portion and the bearing-housing side flange portion.

With the above turbocharger (12), even if the gripping unit thermally expands during transient operation of the engine, the turbine-housing side flange portion and the bearing-housing side flange portion follow the thermal expansion of the gripping unit due to the elastic force. Thus, it is possible to maintain a situation where the gripping unit grips and holds the turbine-housing side flange portion and the bearing-housing side flange portion, and suppress occurrence of loosening in coupling of the turbine housing and the bearing housing.

(13) In some embodiments, in the above turbocharger (12), the gripping unit is configured to make the turbine-housing side flange portion and the bearing-housing side flange portion contact each other at least when the turbocharger is at full load, by elastically deforming the turbine-housing side flange portion in the axial direction toward the bearing-housing side flange portion and elastically deforming the bearing-housing side flange portion in the axial direction toward the turbine-housing side flange portion.

With the above turbocharger (13), when the turbocharger is at full load, the contact part between the turbine-housing side flange portion and the bearing-housing side flange portion serves as a heat transmission path from the turbine housing to the bearing housing. Accordingly, by providing a heat transmission path from the turbine housing to the bearing housing on the radially outer side at a distance from the bearing device, it is possible to improve the turbocharger performance.

Advantageous Effects

According to at least one embodiment of the present invention, provided is a turbocharger capable of suppressing occurrence of loosening in the coupling between the turbine housing and the bearing housing during transient operation of the engine.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved. On the other hand, an expression such as "comprise", "include", "have", "contain" and "constitute" are not intended to be exclusive of other components.

Figure 1:
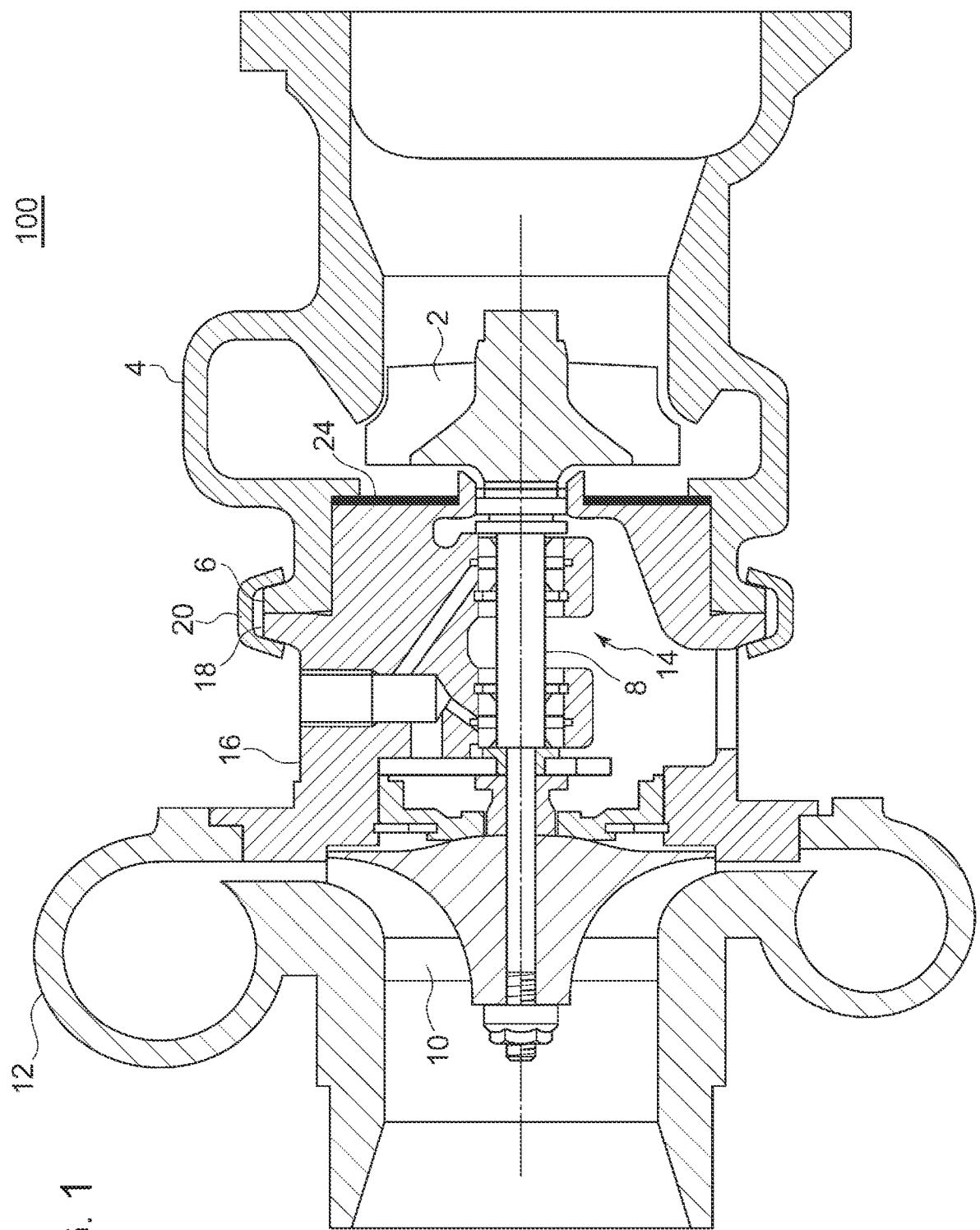
FIG. 1 is a schematic cross-sectional view of a turbocharger 100 according to an embodiment of the present invention, taken along the rotational axis of the turbocharger 100.

FIG. 1 is a schematic cross-sectional view of a turbocharger 100 according to an embodiment of the present invention, taken along the rotational axis of the turbocharger 100.

As shown in FIG. 1, the turbocharger 100 includes a turbine rotor 2, a turbine housing 4 which accommodates the turbine rotor 2, a compressor impeller 10 coupled to the turbine rotor 2 via a shaft 8, a compressor housing 12 which accommodates the compressor impeller 10. The turbine housing 4 has a turbine-housing side flange portion 6 on the radially outer side of the turbine housing 4.

Further, the turbocharger 100 includes a bearing device 14 supporting the shaft 8 rotatably, and a bearing housing 16 which accommodates the bearing device 14. The bearing housing 16 has a bearing-housing side flange portion 18 facing the turbine-housing side flange portion 6, disposed on the radially outer side of the bearing housing 16. Further, the turbocharger 100 includes a gripping unit 20 which holds together the turbine-housing side flange portion 6 and the bearing-housing side flange portion 18 to couple the turbine housing 4 and the bearing housing 16.

Further, the turbocharger 100 includes a back plate 24 having an annular shape, disposed along the back surface 26 of the turbine rotor 2, between the turbine rotor 2 and the bearing housing 16, as a heat shield plate for suppressing heat transmission toward the bearing device 14 from high-temperature exhaust gas that flows through the turbine housing 4. The back plate 24 is held between the turbine housing 4 and the bearing housing 16.

The turbocharger 100 is configured to rotary-drive the turbine rotor 2 with exhaust gas of an engine (not shown), compress air through rotation of the compressor impeller 10 provided coaxially with the turbine rotor 2, and supply the compressed air to the engine.

Figure 2:
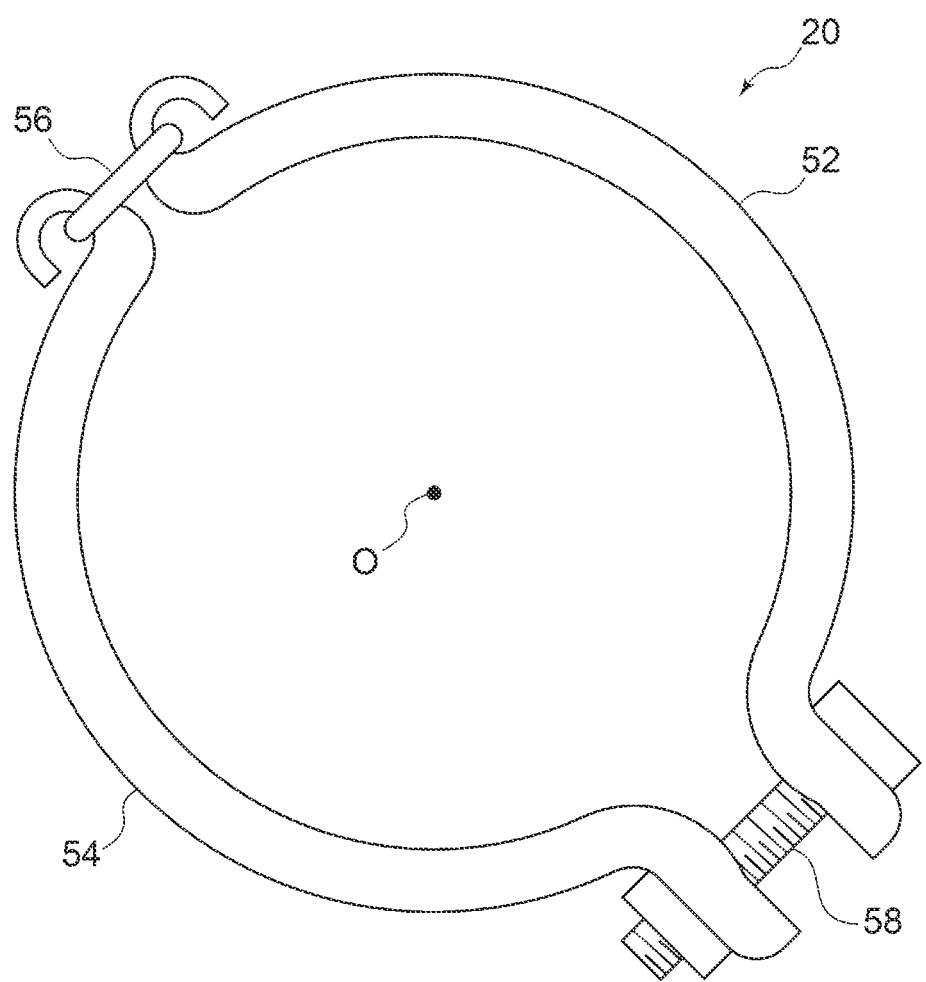
FIG. 2 is a schematic diagram of the structure of a V-band clamp.

The gripping unit 20 may be a V-band clamp (V coupling) shown in FIG. 2, for instance. FIG. 2 is a schematic diagram of the structure of a V-band clamp. The V band clamp fastens the turbine-housing side flange portion 6 (see FIG. 1) and the bearing-housing side flange portion (see FIG. 1) by connecting first end portions of a pair of clamp pieces 52, 54 formed into a semi-arc shape with a link 56 and tightly fastening the second end portions of the clamp pieces 52, 54 with a bolt 58, while the end portions of the clamp pieces 52, 54 are matched in position. That is, the V band clamp is configured to hold the turbine-housing side flange portion 6 and the bearing-housing side flange portion 18 together, as a result of applying a surface pressure toward the center axis O over the entire circumferential direction of the V band clamp (clamp pieces 52, 54) by tightly fastening the bolt 58 as disclosed above. Further, the bearing housing 16 and the compressor housing 12 are coupled by a bolt (not shown).

Figure 3A:
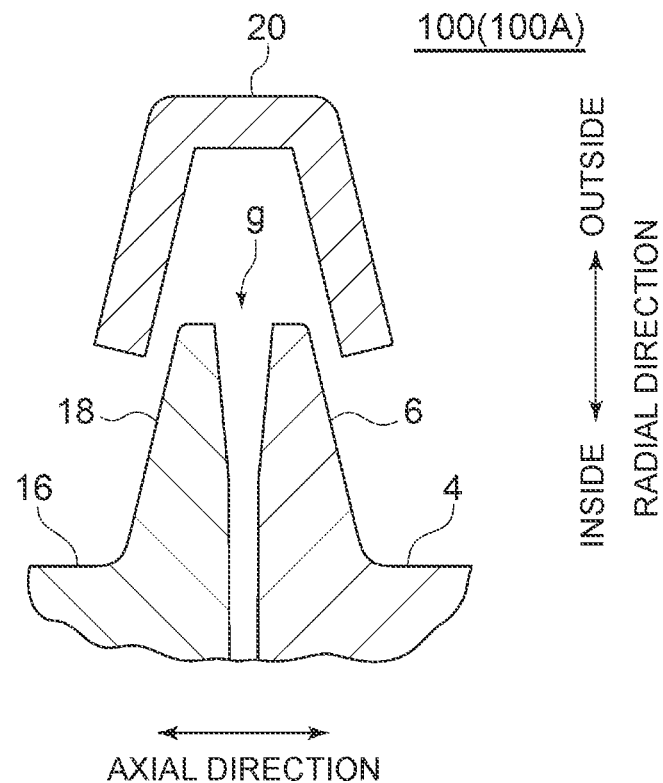
FIG. 3A is an enlarged cross-sectional view showing a turbine-housing side flange portion 6 and a bearing-housing side flange portion 18 before being gripped by a gripping unit 20 of the turbocharger 100 (100A) according to an embodiment.
Figure 3B:
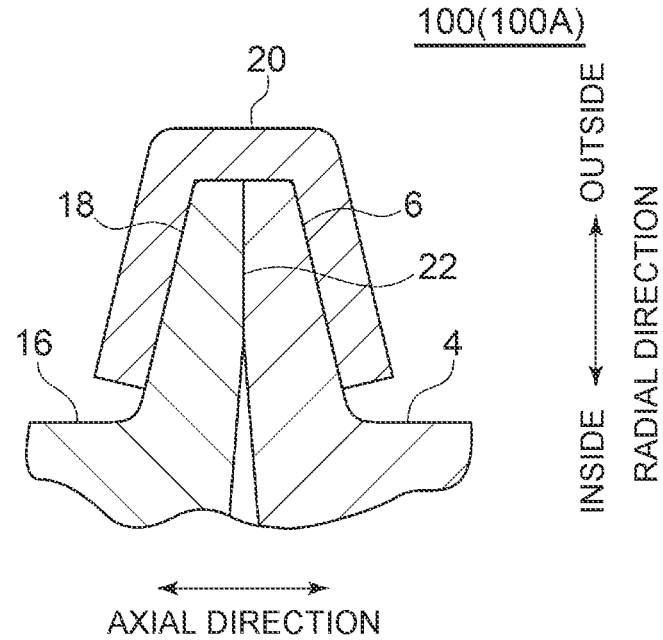
FIG. 3B is an enlarged cross-sectional view showing a turbine-housing side flange portion 6 and a bearing-housing side flange portion 18 after being gripped by a gripping unit 20 of the turbocharger 100 (100A) according to an embodiment.

FIG. 3A is an enlarged view of the turbine-housing side flange portion 6 and the bearing-housing side flange portion 18 before being gripped by the gripping unit 20 in the turbocharger 100 (100A) according to an embodiment. FIG. 3B is an enlarged view of the turbine-housing side flange portion 6 and the bearing-housing side flange portion 18 after being gripped by the gripping unit 20 in the turbocharger 100 (100A) according to an embodiment.

Hereinafter, unless otherwise stated, the axial direction of the turbine rotor 2 is merely referred to as "axial direction", the radial direction of the turbine rotor 2 is merely referred to as "radial direction", and the circumferential direction of the turbine rotor 2 is merely referred to as "circumferential direction".

In an embodiment, as shown in FIG. 3A, a gap 'g' is disposed between the turbine-housing side flange portion 6 and the bearing-housing side flange portion 18 when not being gripped by the gripping unit 20. Further, as shown in FIGS. 3A and 3B, the gripping unit 20 grips the turbine-housing side flange portion 6 and the bearing-housing side flange portion 18 so as to elastically deform the turbine-housing side flange portion 6 toward the bearing-housing side flange portion 18 in the axial direction and elastically deform the bearing-housing side flange portion 18 toward the turbine-housing side flange portion 6 in the axial direction.

Accordingly, the gripping unit 20 generates an elastic force in a direction to separate the turbine-housing side flange portion 6 and the bearing-housing side flange portion 18 from each other, as a reaction force against the gripping force by the gripping unit 20, on each of the turbine housing 4 and the bearing housing 16. In other words, the gripping unit 20 generates an elastic force in a direction away from the bearing-housing side flange portion 18 in the axial direction as the reaction force on the turbine housing 4, and generates an elastic force in a direction away from the turbine-housing side flange portion 6 as the reaction force on the bearing-housing side flange portion 18.

With the above configuration, even if the gripping unit thermally expands during transient operation of the engine, the turbine-housing side flange portion 6 and the bearing-housing side flange portion 18 follow the thermal expansion of the gripping unit 20 due to the elastic forces. Thus, it is possible to maintain a situation where the gripping unit 20 grips and holds the turbine-housing side flange portion 6 and the bearing-housing side flange portion 18, and suppress occurrence of loosening in coupling of the turbine housing 4 and the bearing housing 16.

In an embodiment, as shown in FIGS. 3A and 3B, the gripping unit 20 may be configured to make the turbine-housing side flange portion 6 and the bearing-housing side flange portion 18 contact with each other at least when the turbocharger 100 (100A) is at full load, by elastically deforming the turbine-housing side flange portion 6 toward the bearing-housing side flange portion 18 in the axial direction, and elastically deforming the bearing-housing side flange portion 18 toward the turbine-housing side flange portion 6 in the axial direction.

With the above configuration, when the turbocharger 100 (100A) is at full load, the contact part 22 between the turbine-housing side flange portion 6 and the bearing-housing side flange portion 18 serves as a heat transmission path from the turbine housing 4 to the bearing housing 16. Accordingly, by providing a heat transmission path from the turbine housing 4 to the bearing housing 16 on the radially outer side so as to be away from the bearing device 14, it is possible to improve the turbocharger performance.

Figure 4:
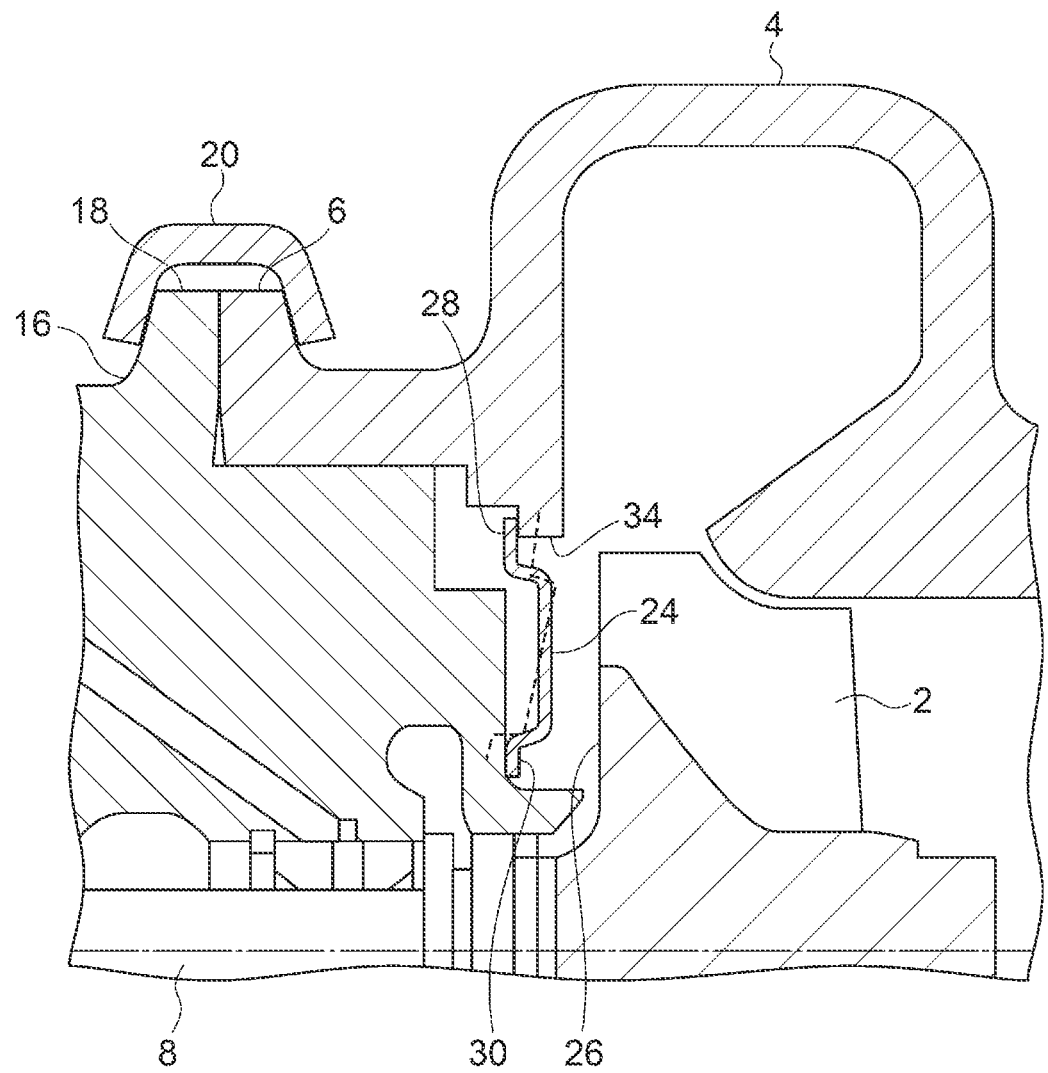
FIG. 4 is an enlarged cross-sectional view of a part of a turbocharger 100 (100B) according to an embodiment.
Figure 5:
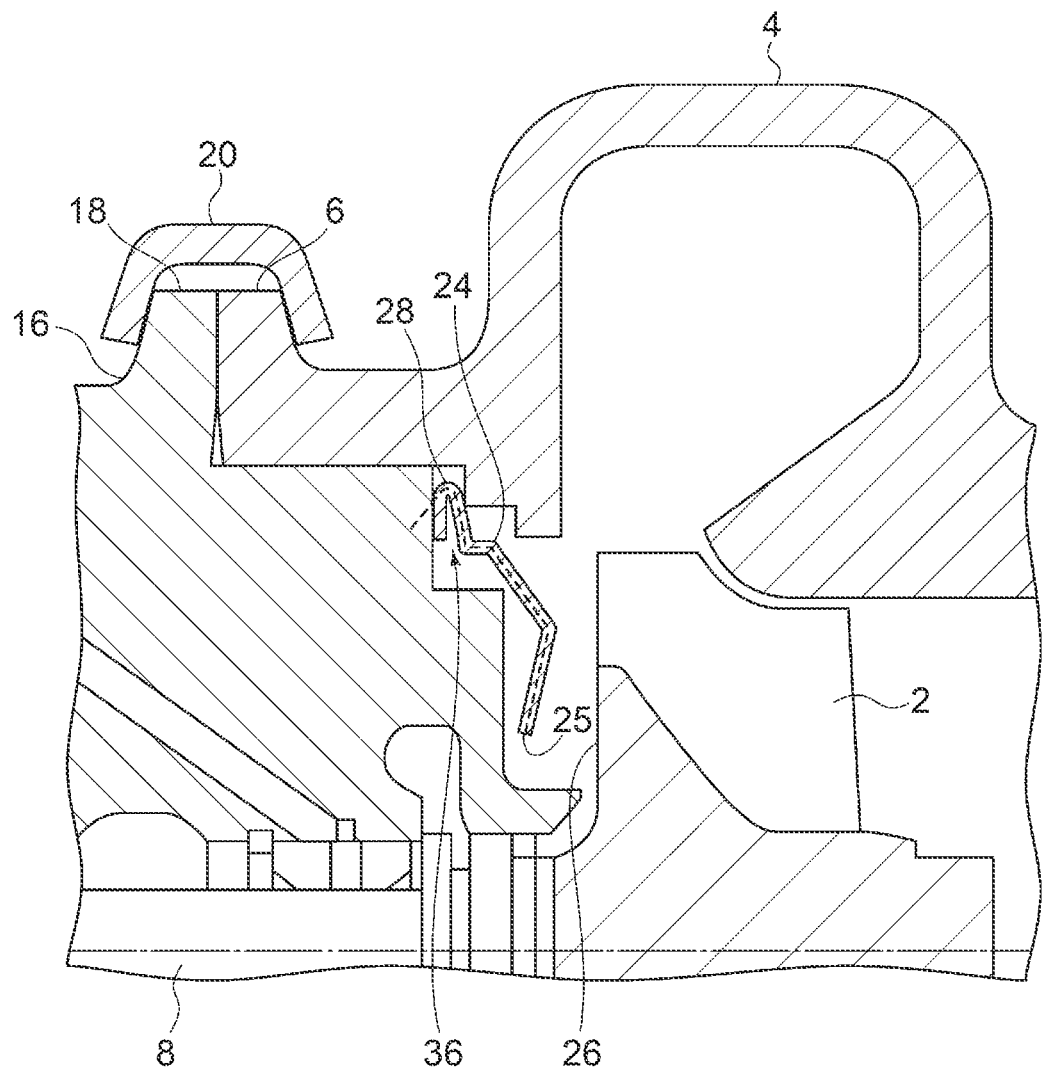
FIG. 5 is an enlarged cross-sectional view of a part of a turbocharger 100 (100C) according to an embodiment.
Figure 6:
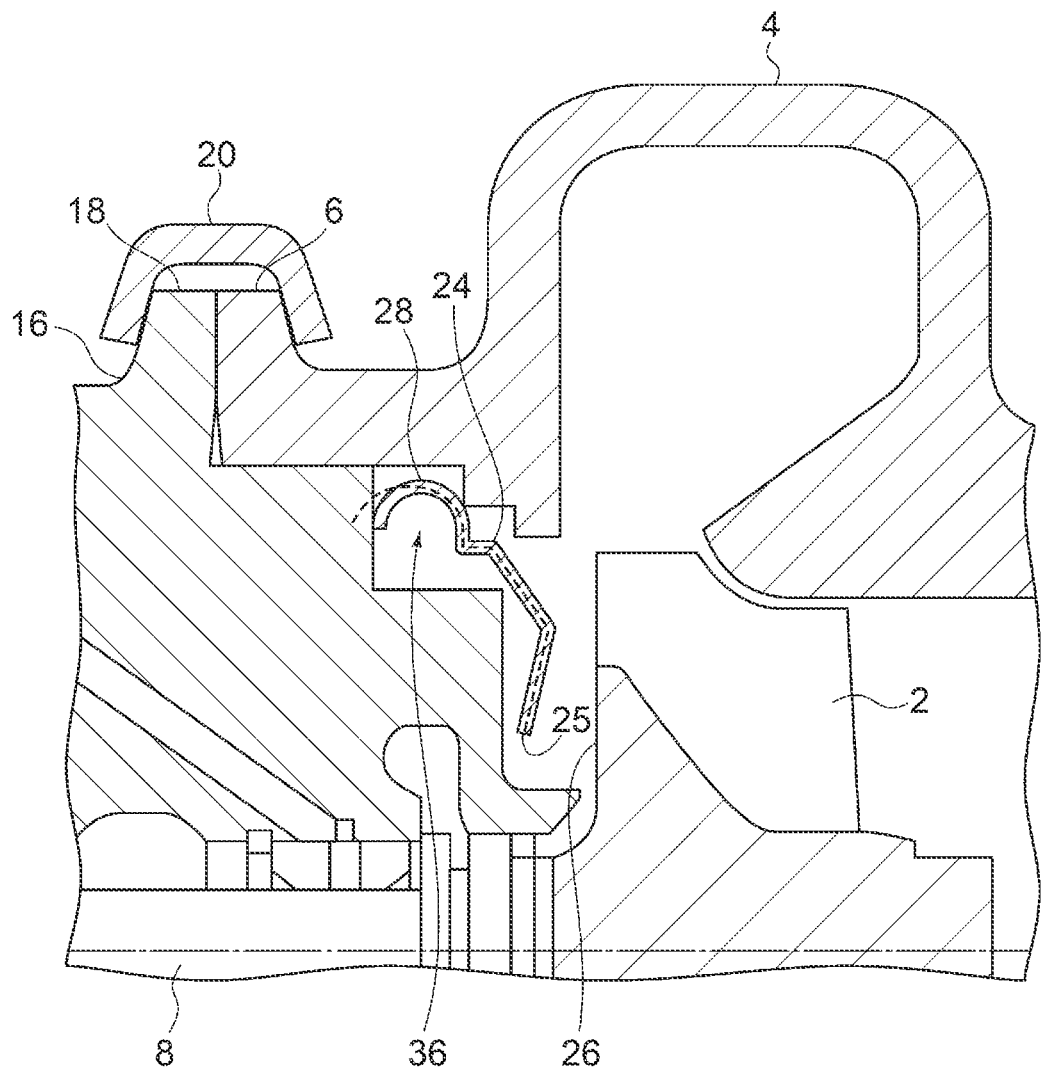
FIG. 6 is an enlarged cross-sectional view of a part of a turbocharger 100 (100D) according to an embodiment.
Figure 7:
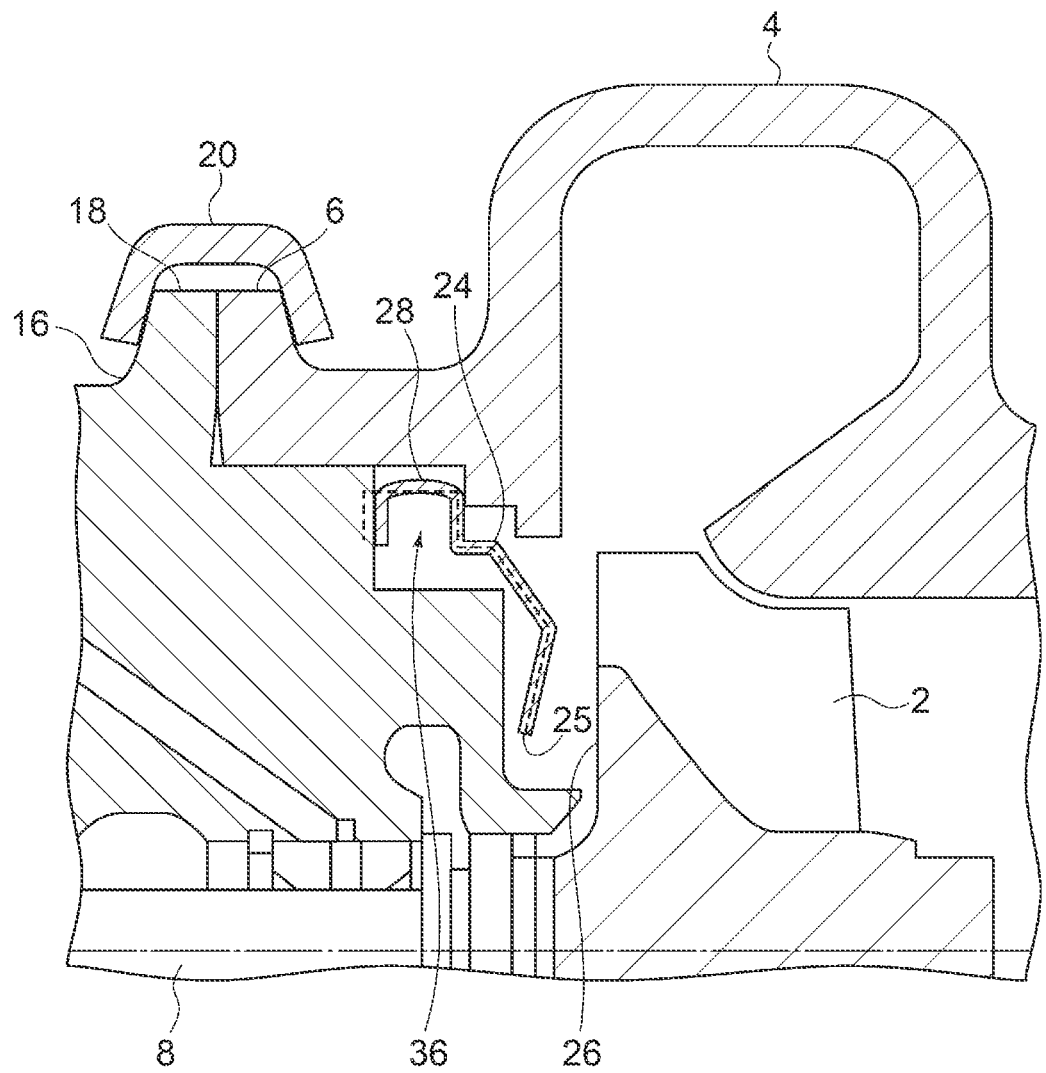
FIG. 7 is an enlarged cross-sectional view of a part of a turbocharger 100 (100E) according to an embodiment.
Figure 8:
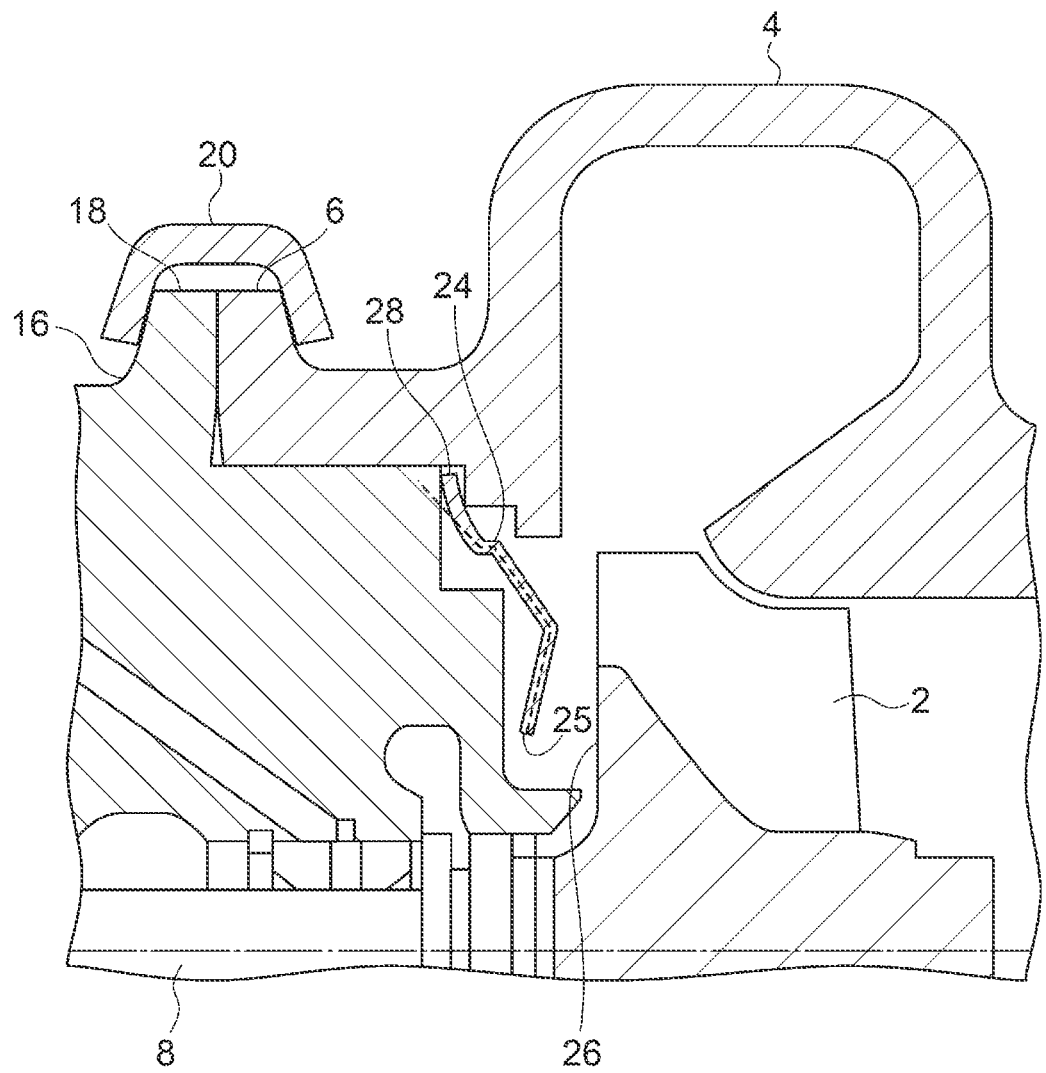
FIG. 8 is an enlarged cross-sectional view of a part of a turbocharger 100 (100F) according to an embodiment.
Figure 9:
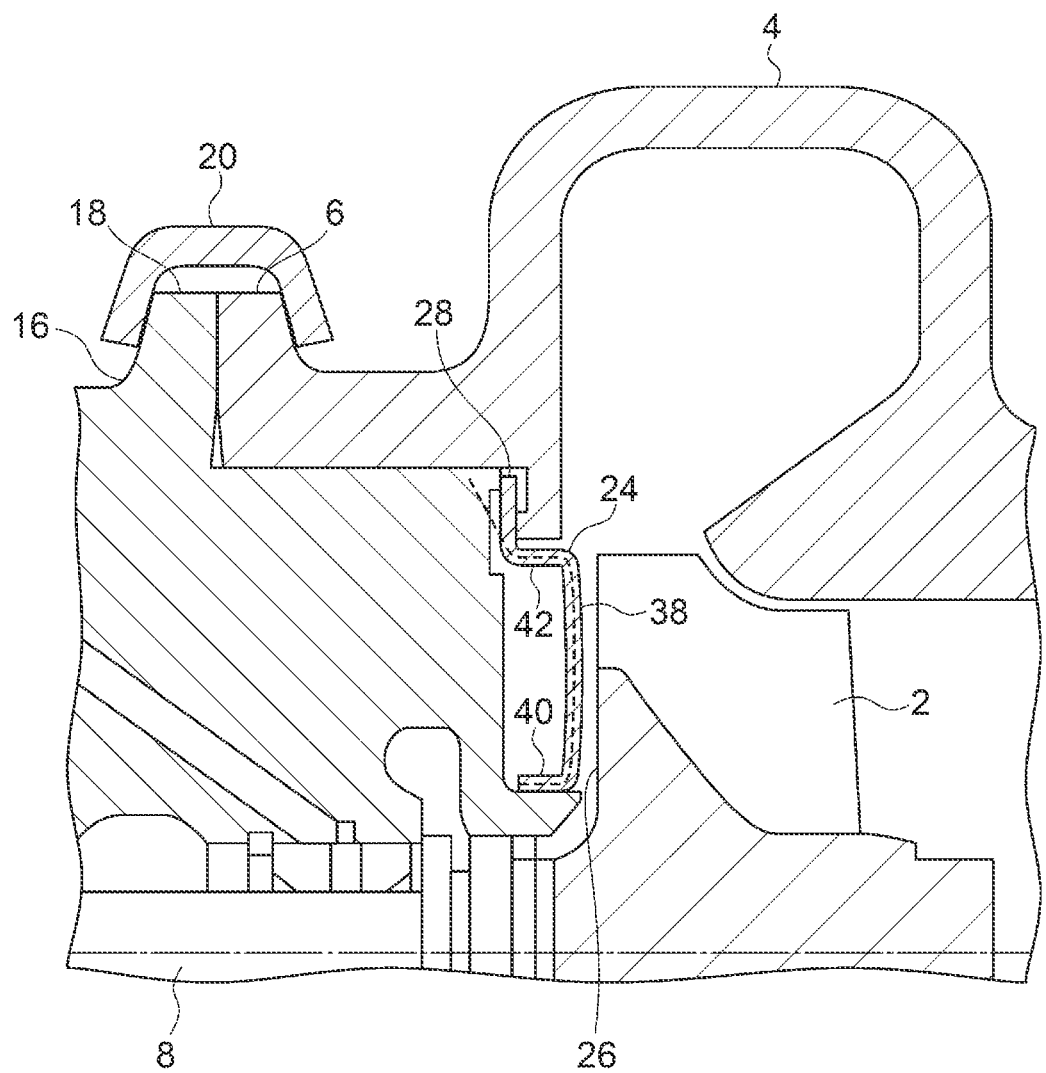
FIG. 9 is an enlarged cross-sectional view of a part of a turbocharger 100 (100G) according to an embodiment.
Figure 10:
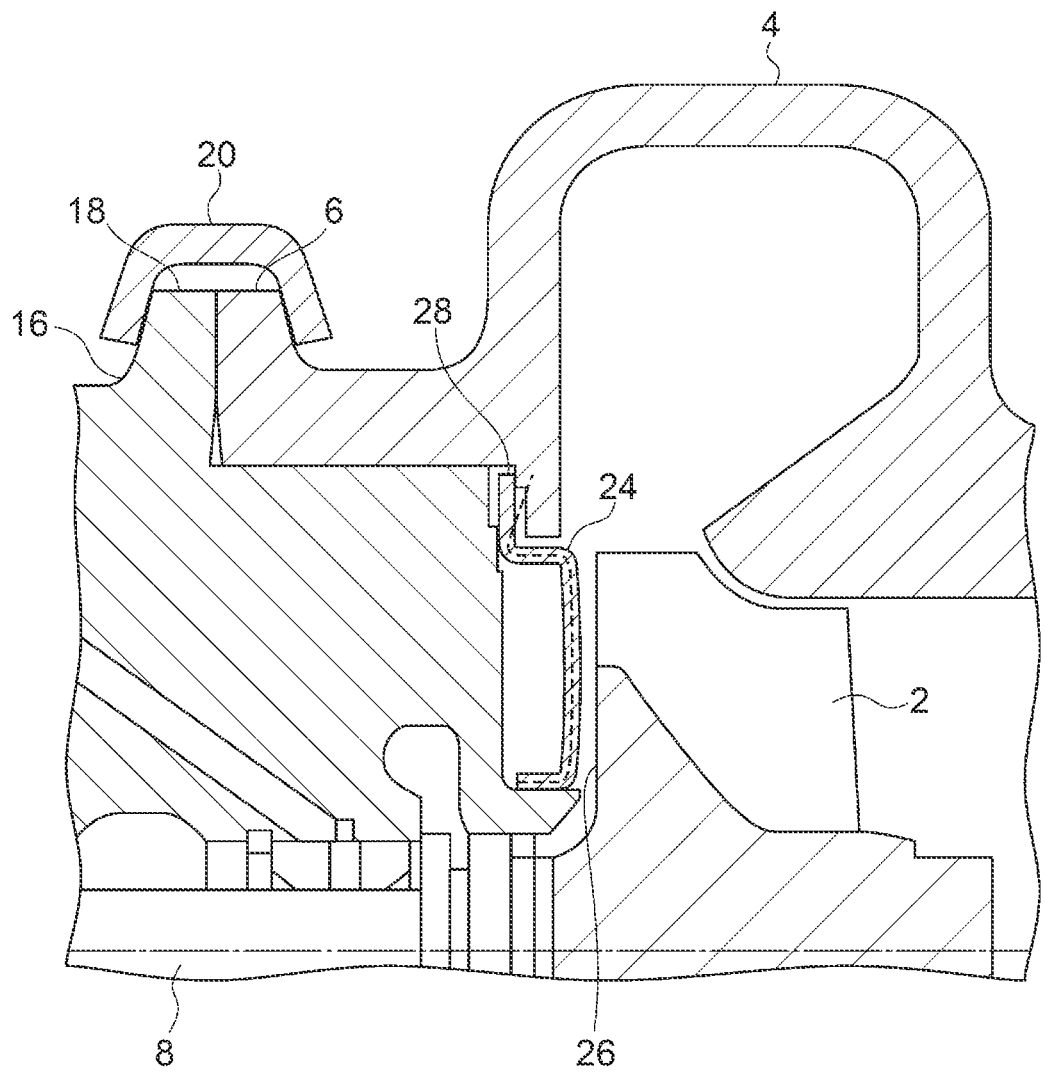
FIG. 10 is an enlarged cross-sectional view of a part of a turbocharger 100 (100H) according to an embodiment.

FIG. 4 is an enlarged cross-sectional view of a part of a turbocharger 100 (100B) according to an embodiment. FIG. 5 is an enlarged cross-sectional view of a part of a turbocharger 100 (100C) according to an embodiment. FIG. 6 is an enlarged cross-sectional view of a part of a turbocharger 100 (100D) according to an embodiment. FIG. 7 is an enlarged cross-sectional view of a part of a turbocharger 100 (100E) according to an embodiment. FIG. 8 is an enlarged cross-sectional view of a part of a turbocharger 100 (100F) according to an embodiment. FIG. 9 is an enlarged cross-sectional view of a part of a turbocharger 100 (100G) according to an embodiment. FIG. 10 is an enlarged cross-sectional view of a part of a turbocharger 100 (100H) according to an embodiment.

In FIGS. 4 to 10, the dotted line represents a virtual center line of the plate thickness of the back plate 24 in the natural state of the back plate 24 (not elastically deformed).

In some embodiments, as shown in FIGS. 4 to 10 for instance, at least a part of the back plate 24 is held between the turbine housing 4 and the bearing housing 16 in an elastically deformed state. The back plate 24 functions as a biasing member (plate spring member) that biases the turbine housing 4 and the bearing housing 16 so as to apply, to each the turbine housing 4 and the bearing housing 16, an elastic forces in a direction to separate the turbine-housing side flange portion 6 and the bearing-housing side flange portion 18 away from each other in the axial direction, while the gripping unit 20 grips and holds the turbine housing 4 and the bearing housing 16.

With the above configuration, even if the gripping unit 20 thermally expands during transient operation of the engine, the turbine-housing side flange portion 6 and the bearing-housing side flange portion 18 follow the thermal expansion of the gripping unit 20 due to above the elastic force of the back plate 24. Thus, it is possible to maintain a situation where the gripping unit 20 grips and holds the turbine-housing side flange portion 6 and the bearing-housing side flange portion 18, and suppress occurrence of loosening in coupling of the turbine housing 4 and the bearing housing 16.

In some embodiments, as shown in FIG. 4, the turbine housing 4 supports a radially outer portion 28 of the back plate 24 in the axial direction from the side of the turbine rotor 2 against the elastic force of the back plate 24. The bearing housing 16 supports a radially inner portion 30 of the back plate 24 in the axial direction from the side opposite to the turbine rotor 2 against the elastic force of the back plate 24. In the illustrative embodiment shown in FIG. 4, the back plate 24 has a cylindrical plate spring shape. In the depicted embodiment, the back plate 24 includes a protruding curved portion 32 curved so as to protrude toward the turbine rotor 2, in a cross section along the axial direction. The radially outer portion 28 of the back plate 24 extends linearly from the protruding curved portion 32 outward in the radial direction, and the radially inner portion 30 extends linearly from the protruding curved portion 32 inward in the radial direction. The turbine housing 4 includes an annular protruding portion 34 protruding inward in the radial direction. The annular protruding portion 34 supports the radially outer portion 28 of the back plate 24 against the elastic force.

With the above configuration, the turbine housing 4 receives an elastic force toward the turbine rotor 2 in the axial direction from the radially outer portion 28 of the back plate 24 (elastic force in a direction to separate the turbine-housing side flange portion 6 from the bearing-housing side flange portion 18) while the turbine housing 4 and the bearing housing 16 are coupled by the gripping unit 20, and the bearing housing 16 receives an elastic force opposite to the turbine rotor 2 in the axial direction from the radially inner portion 30 of the back plate 24 (elastic force in a direction to separate the bearing-housing side flange portion 18 from the turbine-housing side flange portion 6). Thus, it is possible to suppress occurrence of loosening in the coupling of the turbine housing 4 and the bearing housing 16, by utilizing the elastic force of the entire back plate 24.

In some embodiments, as shown in FIGS. 5 to 10, the turbine housing 4 supports the radially outer portion 28 of the back plate 24 in the axial direction from the side of the turbine rotor 2 against the elastic force, and the bearing housing 16 supports the radially outer portion 28 of the back plate 24 in the axial direction from the side opposite to the turbine rotor 2 against the elastic force. In the embodiment shown in FIGS. 5 to 8, the radially outer portion 28 of the back plate 24 has a cylindrical plate spring shape, and an inner peripheral edge 25 of the back plate 24 is a free end separated from the bearing housing 16.

In the embodiment shown in FIGS. 5 to 10, the turbine housing 4 receives an elastic force toward the turbine rotor 2 in the axial direction from the radially outer portion 28 of the back plate 24 (elastic force in a direction to separate the turbine-housing side flange portion 6 from the bearing-housing side flange portion 18) while the turbine housing 4 and the bearing housing 16 are coupled by the gripping unit 20, and the bearing housing 16 receives an elastic force opposite to the turbine rotor 2 in the axial direction from the radially outer portion 28 of the back plate 24 (elastic force in a direction to separate the bearing-housing side flange portion 18 from the turbine-housing side flange portion 6). Thus, it is possible to enhance the design flexibility of the radially inner portion 30 of the back plate 24, while suppressing occurrence of loosening in coupling between the turbine housing 4 and the bearing housing 16 by utilizing an elastic force of the radially outer portion 28 of the back plate 24.

In some embodiments, the cross-sectional shape along the axial direction at the radially outer portion 28 of the back plate 24 may have a V shape as shown in FIG. 5, a C shape as shown in FIG. 6, a rectangular U-shape as shown in FIG. 7, or an oblique line shape that intersects with the axial direction as shown in FIG. 8.

With the above configuration, it is possible to utilize the elastic force of the back plate to suppress occurrence of loosening in the coupling between the turbine housing 4 and the bearing housing 16, while forming the radially outer portion 28 of the back plate 24 into a simple shape.

In some embodiments, as shown in FIGS. 5 to 7, the opening portion 36 of the V shape (see FIG. 5), the opening portion 36 of the C shape (see FIG. 6), or the opening portion 36 of the rectangular U shape (see FIG. 7) is open toward the inner side with respect to the radial direction of the turbine rotor.

With the above configuration, it is possible to utilize the elastic force of the back plate to suppress occurrence of loosening in the coupling between the turbine housing 4 and the bearing housing 16, while forming the back plate 24 into a simple shape.

In some embodiments, as shown in FIG. 9, the radially outer portion 28 of the back plate 24 is elastically deformed in the axial direction toward the turbine rotor 2, and the turbine housing 4 supports the back plate 24 at a position closer to the radially inner side from a position where the radially outer portion 28 is supported by the bearing housing 16.

In the illustrative embodiment shown in FIG. 9, the back plate 24 includes, in a cross section along the axial direction, a first linear portion 38 extending in the radial direction along a back surface 26 of the turbine rotor 2, a second linear portion 40 extending opposite to the turbine rotor 2 along the axial direction from the radially inner end of the first linear portion 38, and a third linear portion 42 extending opposite to the turbine rotor 2 along the axial direction from the radially outer end of the first linear portion 38. The radially outer portion 28 extends linearly outward in the radial direction from an end portion of the third linear portion 42 that is opposite to the turbine rotor 2. The second linear portion 40 may be in contact with the bearing housing 16 on the radially inner side as shown in the drawing, or may be separated from the bearing housing 16.

Also with the above configuration, it is possible to utilize the elastic force of the back plate to suppress occurrence of loosening in the coupling between the turbine housing 4 and the bearing housing 16, while forming the back plate 24 into a simple shape.

In some embodiments, as shown in FIG. 10 for instance, the radially outer portion 28 of the back plate 24 is elastically deformed in the axial direction opposite to the turbine rotor 2, and the turbine housing 4 supports the back plate 24 at a position closer to the radially outer side from a position where the radially outer portion 28 is supported by the bearing housing 16.

Also in the embodiment shown in FIG. 10, the back plate 24 includes, in a cross section along the axial direction, a first linear portion 38 extending in the radial direction along the back surface 26 of the turbine rotor 2, a second linear portion 40 extending opposite to the turbine rotor 2 along the axial direction from the radially inner end of the first linear portion 38, and a third linear portion 42 extending opposite to the turbine rotor 2 along the axial direction from the radially outer end of the first linear portion 38. The radially outer portion 28 extends linearly outward in the radial direction from an end portion of the third linear portion 42 that is opposite to the turbine rotor 2. The second linear portion 40 may be in contact with the bearing housing 16 on the radially inner side as shown in the drawing, or may be separated from the bearing housing 16.

Also with the above configuration, it is possible to utilize the elastic force of the back plate to suppress occurrence of loosening in the coupling between the turbine housing 4 and the bearing housing 16, while forming the back plate 24 into a simple shape.

Figure 11:
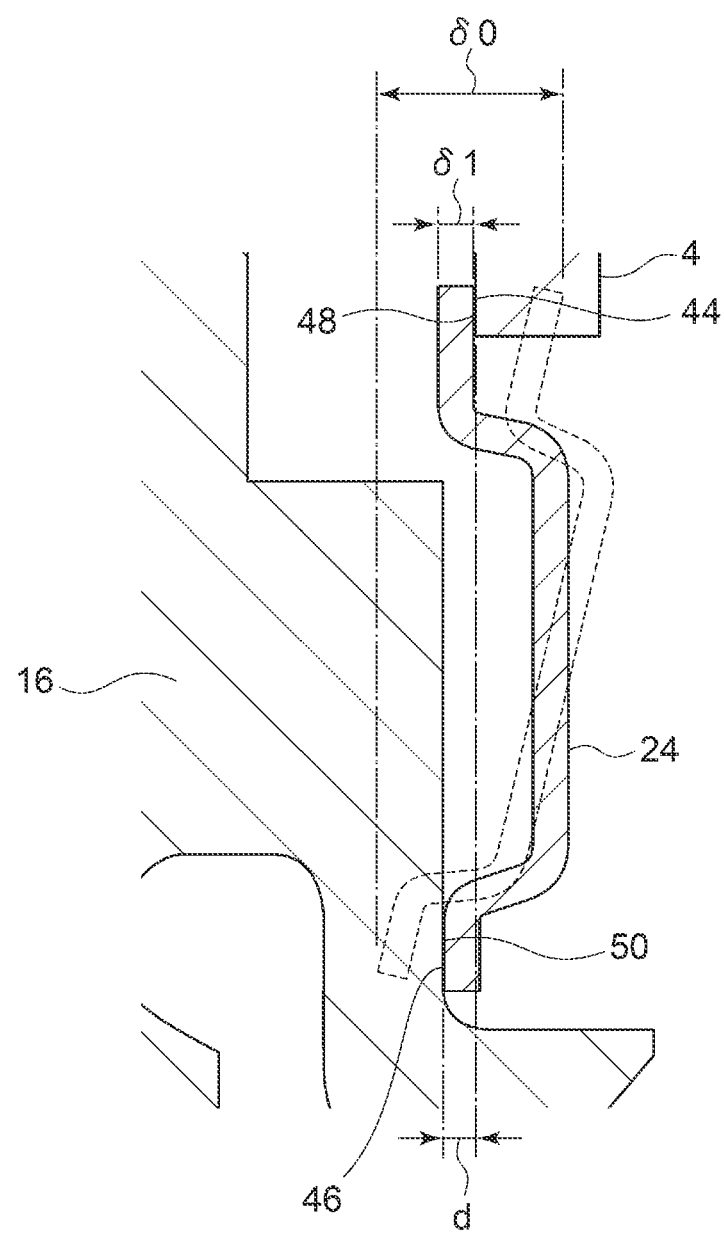
FIG. 11 is an enlarged cross-sectional view of a part of the turbocharger 100 (100B) shown in FIG. 4.
Figure 12:
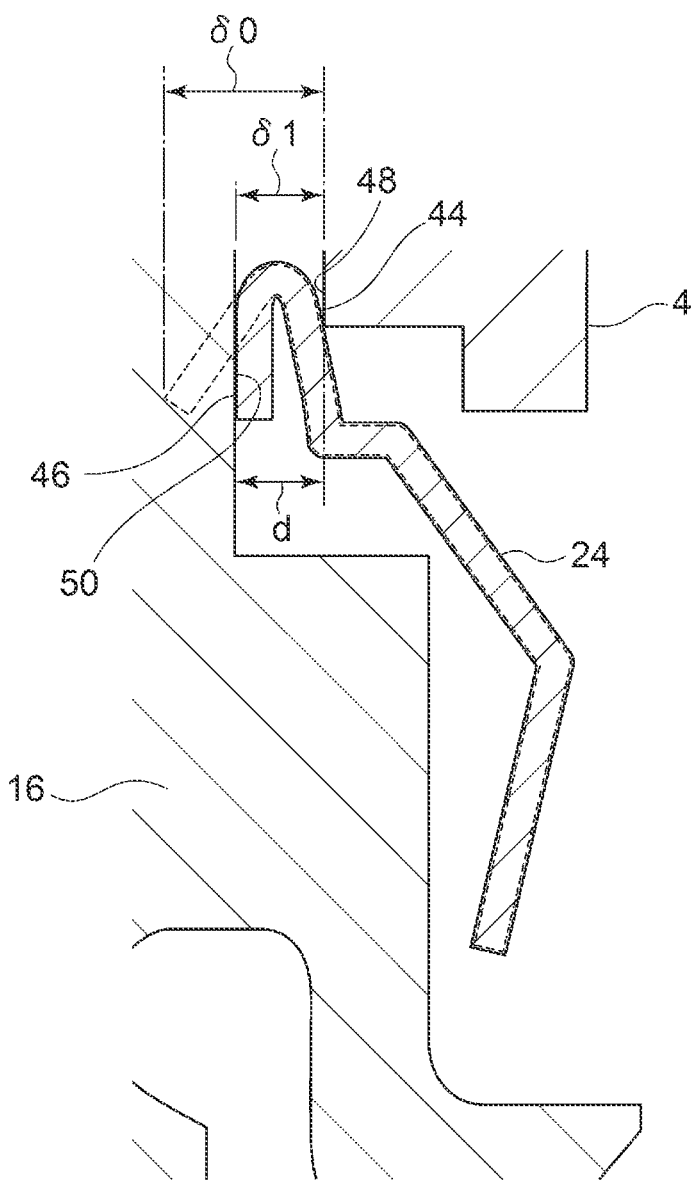
FIG. 12 is an enlarged cross-sectional view of a part of the turbocharger 100 (100C) shown in FIG. 5.
Figure 13:
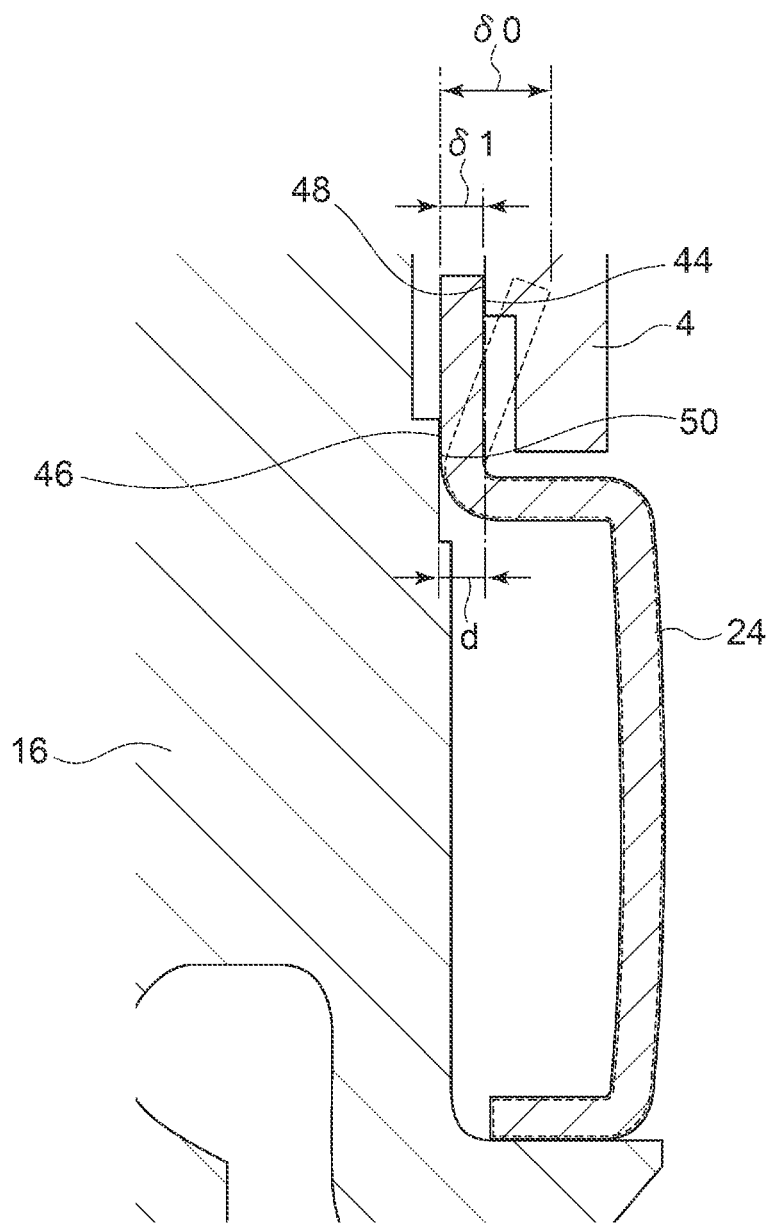
FIG. 13 is an enlarged cross-sectional view of a part of the turbocharger 100 (100H) shown in FIG. 10.

FIG. 11 is an enlarged cross-sectional view of a part of the turbocharger 100 (100B) shown in FIG. 4. FIG. 12 is an enlarged cross-sectional view of a part of the turbocharger 100 (100C) shown in FIG. 5. FIG. 13 is an enlarged cross-sectional view of a part of the turbocharger 100 (100H) shown in FIG. 10.

In some embodiments, as shown in FIGS. 11 to 13 for instance, the back plate 24 is configured to satisfy an expression df−di<δ0−δ1, where δ is a step in the axial direction between a back-plate side first supported portion 44 of the back plate 24 supported on the turbine housing 4, and a back-plate side second supported portion 46 of the back plate 24 supported on the bearing housing 16, δ0 is the step δ in the natural state of the back plate 24, δ1 is an initial step δ in the initial state after the back plate 24 is mounted, d is a distance in the axial direction between a turbine-housing side support portion 48 of the turbine housing 4 supporting the back-plate side first supported portion 44 and a bearing-housing side support portion 50 of the bearing housing 16 supporting the back-plate side second supported portion 46, di is the distance d in the initial state, and df is the distance d at the time when the turbocharger 100 is at full load. That is, the back plate 24 is configured such that the difference (df−di) between the distance df and the distance di is smaller than the difference (δ0−δ2) between the step δ0 and the step δ1.

Herein, the "initial state" refers to a state where the back plate 24 is disposed between the turbine housing 4 and the bearing housing 16, the turbine housing 4 and the bearing housing 16 are coupled by the gripping unit 20, and the turbocharger 100 is not yet started for the first time.

With the above configuration, even if the distance between the turbine-housing side support portion 48 and the bearing-housing side support portion 50 is increased from the initial state corresponding to the above difference (df−di) due to thermal expansion of the turbine housing 4 and the bearing housing 16 when the turbocharger 100 is at full load, the back-plate side first supported portion 44 follows the turbine-housing side support portion 48 and the back-plate side second supported portion 46 follows the bearing-housing side support portion 50, due to the elastic force of the back plate 24. Thus, it is possible to utilize the elastic force of the back plate to suppress occurrence of loosening in the coupling between the turbine housing 4 and the bearing housing 16, over the period from the standing time to the full-load time of the turbocharger 100.

In some embodiments, as shown in FIGS. 4 to 10, while the turbine housing 4 and the bearing housing 16 are coupled by the gripping unit 20, the turbine-housing side flange portion 6 and the bearing-housing side flange portion 18 are in contact in the initial state after the back plate 24 is mounted.

With the above configuration, in the initial state after the back plate 24 is mounted, the turbine-housing side flange portion 6 and the bearing-housing side flange portion 18 are in contact regardless of the dimension variation of the plate thickness or the like of the back plate, which facilitates management of the gripping force of the gripping unit 20 to grip the turbine-housing side flange portion 6 and the bearing-housing side flange portion 18 (if the gripping unit 20 is the above described V band clamp, management of the fastening force of the bolt 58). In other words, it is possible to stabilize the coupling state between the turbine housing 4 and the bearing housing 16.

Embodiments of the present invention were described in detail above, but the present invention is not limited thereto, and various amendments and modifications may be implemented.

For instance, the configuration of the gripping unit 20, the turbine-housing side flange portion 6, and the bearing-housing side flange portion 18 described with reference to FIGS. 3A and 3B can be also applied to the turbocharger 100 (100B to 100H) shown in FIGS. 4 to 10.

Further, while the back plate 24 of the turbocharger 100 (100B, 100C, 100H) described above with reference to FIGS. 11 to 13 for instance is configured to satisfy df−di<δ0−δ1, the back plate 24 of the above described turbocharger 100 (100D to 100G) may be also configured to satisfy df−di<δ0−δ1.

DESCRIPTION OF REFERENCE NUMERALS

2 Turbine rotor
4 Turbine housing
6 Turbine-housing side flange portion
8 Shaft
10 Compressor impeller
12 Compressor housing
14 Bearing device
16 Bearing housing
18 Bearing-housing side flange portion
20 Gripping unit
22 Contact part
24 Back plate
25 Inner peripheral edge
26 Back surface
28 Radially outer portion
30 Radially inner portion
32 Protruding curved portion
34 Annular protruding portion
36 Opening portion
38 First linear portion
40 Second linear portion
42 Third linear portion
44 First supported portion
46 Second supported portion
48 Turbine-housing side support portion
50 Bearing-housing side support portion
52, 54 Clamp piece
56 Link 58 Bolt
100 Turbocharger
O Center axis
d, df Distance
g Gap

The invention claimed is:

1. A turbocharger, comprising:
   a turbine rotor;
   a turbine housing which includes a turbine-housing side flange portion on a radially outer side, and which accommodates the turbine rotor;
   a bearing device rotatably supporting a shaft connected to the turbine rotor; and
   a bearing housing which includes, on a radially outer side, a bearing-housing side flange portion facing the turbine-housing side flange portion, and which accommodates the bearing device; and
   a clamp gripping the turbine-housing side flange portion and the bearing-housing side flange portion to couple the turbine housing and the bearing housing,
   wherein, in a state where the turbine housing and the bearing housing are coupled by the clamp, an elastic force in a direction to separate the turbine-housing side flange portion and the bearing-housing side flange portion from each other is applied to each of the turbine housing and the bearing housing,
   wherein the turbocharger further comprises a biasing member disposed between the turbine housing and the bearing housing, and configured to bias the turbine housing and the bearing housing so as to apply the elastic force to the turbine housing and the bearing housing,
   wherein the biasing member is a back plate disposed between the turbine rotor and the bearing housing,
   wherein at least a part of the back plate is held between the turbine housing and the bearing housing in an elastically deformed state,
   wherein the back plate is supported on the turbine housing from a first side in an axial direction of the turbine rotor and is supported on the bearing housing from a second side in the axial direction,
   wherein the back plate is configured to satisfy an expression $df-di<\delta 0-\delta 1$, where
   $\delta$ is a step in the axial direction between a back-plate side first supported portion of the back plate supported on the turbine housing, and a back-plate side second supported portion of the back plate supported on the bearing housing, $\delta 0$ is the step $\delta$ in a natural state of the back plate, $\delta 1$ is an initial step $\delta$ of the step $\delta$ in an initial state after the back plate is mounted,
   d is a distance in the axial direction between a turbine-housing side support portion of the turbine housing supporting the back-plate side first supported portion and a bearing-housing side support portion of the bearing housing supporting the back-plate side second supported portion, di is the distance d in the initial state, and df is the distance d at the time when the turbocharger is at full load,
   wherein the turbine housing supports a radially outer portion of the back plate in the axial direction of the turbine rotor from a side of the turbine rotor against the elastic force, wherein the bearing housing supports the radially outer portion of the back plate in the axial direction from a side opposite to the turbine rotor against the elastic force, and
   wherein an inner peripheral edge of the back plate is a free end separated from the bearing housing.

2. The turbocharger according to claim 1,
   wherein the radially outer portion of the back plate has a cross-sectional shape along the axial direction which is a V shape, a C shape, a rectangular U shape, or an oblique shape intersecting with the axial direction.

3. The turbocharger according to claim 2,
   wherein a cross-sectional shape of the radially outer portion of the back plate along the axial direction is a V shape, a C shape, or a rectangular U shape, and an opening of the V shape, an opening of the C shape, or an opening of the rectangular U shape is open toward an inner side or an outer side in a radial direction of the turbine rotor.

4. The turbocharger according to claim 1,
   wherein the radially outer portion of the back plate is elastically deformed opposite to the turbine rotor in the axial direction of the turbine rotor, and
   wherein the turbine housing supports the back plate on a radially outer side of a position where the radially outer portion is supported by the bearing housing.

5. The turbocharger according to claim 1,
   wherein the radially outer portion of the back plate is elastically deformed toward the turbine rotor in the axial direction of the turbine rotor, and
   wherein the turbine housing supports the back plate on a radially inner side of a position where the radially outer portion is supported by the bearing housing.

6. The turbocharger according to claim 1,
   wherein, in a state where the turbine housing and the bearing housing are coupled by the clamp, the turbine-housing side flange portion and the bearing-housing side flange portion are in contact after the back plate is mounted.

\* \* \* \* \*